United States Patent
Paek

(10) Patent No.: US 9,275,288 B2
(45) Date of Patent: Mar. 1, 2016

(54) LANE RECOGNITION SYSTEM AND METHOD USING DEFOG SENSOR

(71) Applicant: MANDO CORPORATION, Pyeongtaek-si (KR)

(72) Inventor: Seung Bum Paek, Seoul (KR)

(73) Assignee: MANDO CORPORATION, Pyeongtaek-Si (KR)

( * ) Notice: Subject to any disclaimer, the term of this patent is extended or adjusted under 35 U.S.C. 154(b) by 0 days.

(21) Appl. No.: 14/316,593

(22) Filed: Jun. 26, 2014

(65) Prior Publication Data

US 2015/0181173 A1 Jun. 25, 2015

(30) Foreign Application Priority Data

Dec. 24, 2013 (KR) .................. 10-2013-0162367

(51) Int. Cl.
| | |
|---|---|
| H04N 7/18 | (2006.01) |
| G06K 9/00 | (2006.01) |
| B60K 35/00 | (2006.01) |
| B60W 10/30 | (2006.01) |
| G06T 7/00 | (2006.01) |
| B60H 1/00 | (2006.01) |

(52) U.S. Cl.
CPC ........ *G06K 9/00798* (2013.01); *B60H 1/00785* (2013.01); *B60K 35/00* (2013.01); *B60W 10/30* (2013.01); *G06K 9/00791* (2013.01); *G06T 7/0042* (2013.01); *G06T 7/0081* (2013.01); *B60K 2350/1076* (2013.01); *B60K 2350/2013* (2013.01); *B60K 2350/962* (2013.01)

(58) Field of Classification Search
CPC ........... G06K 9/00798; G06K 9/00791; G06T 7/0081; G06T 7/0083; G06T 7/0042; G06T 2207/30256; B60W 10/30; B60H 1/00785; B60H 1/00814; B60K 2350/1076; B60K 2350/962; B60K 2350/2013; B60K 35/00; B60S 1/023; B60Q 1/0023; B60Q 2300/312
USPC .............. 701/28, 117, 300, 36, 523; 382/104, 382/106, 199; 237/5; 348/118
See application file for complete search history.

(56) References Cited

U.S. PATENT DOCUMENTS

| | | | | |
|---|---|---|---|---|
| 4,794,537 | A * | 12/1988 | Adasek .............. | G05D 23/2015 237/5 |
| 7,362,883 | B2 * | 4/2008 | Otsuka ..................... | G06K 9/00 348/116 |
| 2007/0115357 | A1 * | 5/2007 | Stein .................... | B60Q 1/0023 348/148 |

FOREIGN PATENT DOCUMENTS

KR      10-0666276 B1      1/2007

* cited by examiner

*Primary Examiner* — Adam Tissot
(74) *Attorney, Agent, or Firm* — Ladas & Parry, LLP

(57) ABSTRACT

Disclosed herein is a lane recognition system using a defog sensor, including: a defog sensor mounted in a defogging system of a vehicle; an imaging unit mounted on a windshield of the vehicle so as to image the front of the vehicle; and an integrated control unit configured to analyze a defog sensor signal received from the defog sensor, process an image signal received from the imaging unit based on the analyzed defog sensor signal, and acquire lane information.

14 Claims, 4 Drawing Sheets

LANE RECOGNITION SYSTEM AND METHOD USING DEFOG SENSOR

CROSS-REFERENCE(S) TO RELATED APPLICATIONS

This application claims priority to Korean Patent Application No(s). 10-2013-0162367, filed on Dec. 24, 2013, the disclosure(s) of which is(are) incorporated herein by reference in its(their) entirety.

BACKGROUND OF THE INVENTION

1. Field of the Invention

Exemplary embodiments of the present invention relate to a lane recognition system and method using a defog sensor, and more particularly, to a lane recognition system and method using a defog sensor, which analyzes a signal of the defog sensor and acquires final lane information through image processing based on the analyzed signal.

2. Description of the Related Art

Recently, in the automobile industry, research has been actively conducted on the development of technology related to an advanced driver assistance system (ADAS) for supporting a driver's driving ability.

In particular, many ADASs based on lane recognition technology have emerged. Representative examples of the ADAS may include a lane departure warning system (LDWS).

Korean Patent No. 10-0666276 (Patent Document 1) has disclosed a lane recognition method according to the related art.

Patent Document 1 relates to a lane departure warning method using a vanishing point. FIG. 5 is a flowchart illustrating the lane departure warning method according to the related art.

Referring to FIG. 5, the lane departure warning method according to the related art includes: receiving an image of a lane through a camera; binarizing the image information of the lane; extracting edges by removing unnecessary portions of the binarized lane information; calculating the slope of the lane through an equation of straight line based on input lanes at both sides, and modeling a graph of the lane; comparing the graph of the modeled lane to a preset warning threshold section; and issuing a warning to a driver when the graph of the lane exceeds the warning threshold section. Through the lane departure warning method, a process of analyzing lane information inputted from an image input unit during the operation of a vehicle may be performed with more precision.

However, although various related techniques have been developed, the lane recognition precision of the lane departure warning system and method may be significantly degraded in a special environment in which frost or demister is formed on the windshield of a vehicle as illustrated in FIG. 1A or 1B.

Furthermore, when a lane is misrecognized due to the frost or demister, the lane departure warning system based on the misrecognized lane may malfunction to increase the risk of an accident during operation.

Recently, a defogging system has been developed, which operates an air-conditioning system inside a vehicle when a defog sensor senses frost or demister on a windshield. However, since the air-conditioning system is implemented separately from the operation of the lane recognition system, the defogging system does not contribute to the improvement of lane recognition precision.

SUMMARY OF THE INVENTION

The present invention has been made in view of the above problems, and it is an object of the present invention to provide a lane recognition system and method using a defog sensor, which analyzes a defog sensor signal and acquires final lane information through image processing based on the analyzed defog sensor signal, thereby accurately recognizing lanes in a special environment in which frost or demister is formed on a windshield.

It is another objected of the present invention to provide a land recognition system and method using a defog sensor, which prevents misrecognition of lanes due to frost or demister and minimizes a malfunction of a lane departure warning device or the like, thereby reducing the risk of an accident during operation.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a lane recognition system using a defog sensor may include: a defog sensor mounted in a defogging system of a vehicle; an imaging unit mounted on a windshield of the vehicle so as to image the front of the vehicle; and an integrated control unit configured to analyze a defog sensor signal received from the defog sensor, process an image signal received from the imaging unit based on the analyzed defog sensor signal, and acquire lane information.

The defog sensor may sense the temperature of the windshield and the external temperature.

When processing the image signal, the integrated control unit may analyze the defog sensor signal, and highlight edges of the image in case where a difference between the temperature of the windshield and the external temperature is less than a predetermined value.

When processing the image signal, the integrated control unit may analyze the defog sensor signal, and set a reference vanishing point region such that only an edge corresponding to a vanishing point in a predetermined region is recognized as a lane edge, in case where a difference between the temperature of the windshield and the external temperature is less than a predetermined value.

When processing the image signal, the integrated control unit may analyze the defog sensor signal, and highlight edges of the image or set a reference vanishing point region such that only an edge corresponding to a vanishing point in a predetermined region is recognized as a lane edge, in case where a difference between the temperature of the windshield and the external temperature is less than a predetermined value.

The integrated control unit may extract edges expected as lines on the basis of one or more of the highlighted edges of the image and the reference vanishing point region, cluster the extracted edges through a predetermined algorithm, and remove unnecessary edge groups which do not correspond to the lane information, thereby acquiring lane information.

The predetermined reference value may be set to three degrees.

The reference vanishing point region may be set in the range of above 20 pixels at the center point of the image to below 5 pixels at a point corresponding to 50 m to the front, in the case of a quarter video graphics array (QVGA).

The integrated control unit may transmit the acquired lane information to a lane recognition-based advanced driver assistance system (ADAS) of the vehicle.

The imaging unit may include a charge-coupled device (CCD) camera.

The defog sensor, the imaging unit, and the integrated control unit may be implemented on the basis of a single ECU.

In accordance with one aspect of the present invention, a lane recognition method using a defog sensor may include: a signal reception step of receiving a defog sensor signal from a defog sensor provided in a defogging system of a vehicle, and receiving an image signal from an imaging unit which is mounted on a windshield of the vehicle so as to image the front of the vehicle; an image processing step of analyzing the defog sensor signal received at the signal reception step and processing the image signal based on the analyzed defog sensor signal; and acquiring lane information from the image processed at the image processing step.

The image processing step may include: a processing reference setting step of analyzing the defog sensor signal and highlighting edges of the image or setting a reference vanishing point region when a difference between the temperature of the windshield and the external temperature is less than a predetermined reference value; an edge extraction step of extracting edges expected as lanes on the basis of the reference set at the processing reference setting step; a clustering step of clustering the edges extracted at the edge extraction step through a predetermined algorithm; and a filtering step of removing unnecessary edge groups which do not correspond to the lane information among the edge groups formed at the clustering step.

The predetermined reference value may be set to three degrees.

The reference vanishing point region may be set in the range of above 20 pixels at the center point of the image to below 5 pixels at a point corresponding to 50 m to the front, in the case of a QVGA.

The lane recognition system may further include transmitting the acquired lane information to a lane recognition-based ADAS of the vehicle, after the lane information acquisition step.

The signal reception step, the image processing step, and the lane information acquisition step may be implemented on the basis of a single ECU.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

In the accompanying drawings, illustration of each component may be exaggerated for convenience in description and clarity. Furthermore, the terms as used herein are defined by taking functions of the invention into account and can be changed according to the custom or intention of users or operators. Therefore, definition of the terms should be made according to the overall disclosures set forth herein. Furthermore, embodiments of the present invention are only examples of components described in claims, and do not limit the scope of the present invention, and claims must be analyzed on the basis of the technical idea throughout the present specification.

Figure 1A:
FIGS. 1A and 1B are photographs showing examples in which frost and demister are formed on the windshield of a vehicle.
Figure 1B:
Figure 2:
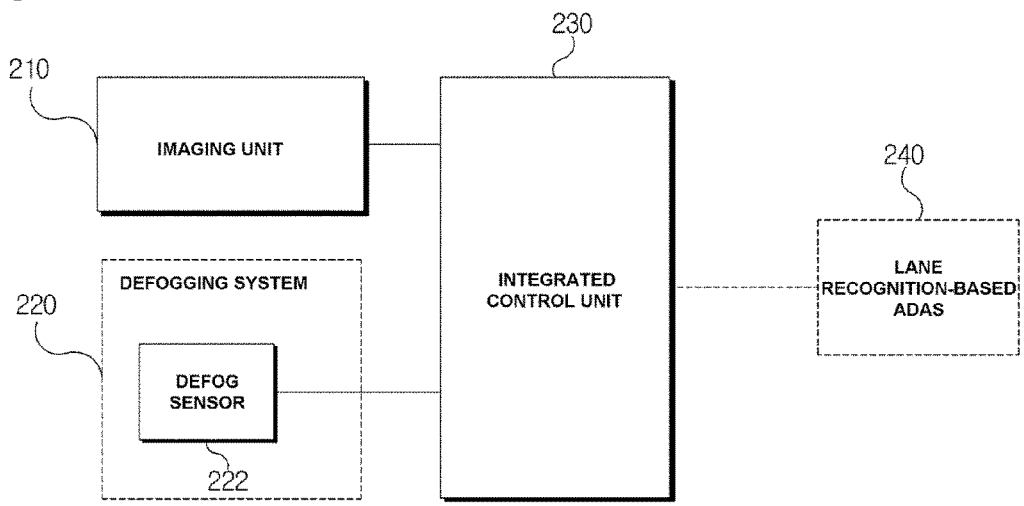
FIG. 2 is a schematic configuration diagram of a lane recognition system using a defog sensor according to an embodiment of the present invention.

FIG. 2 is a schematic configuration diagram of a lane recognition system using a defog sensor according to an embodiment of the present invention.

Referring to FIG. 2, the lane recognition system using a defog sensor according to the embodiment of the present invention includes a defog sensor 222, an imaging unit 210, and an integrated control unit 230.

The imaging unit 210 is mounted on the windshield of a vehicle, and performs a function of imaging the front of the vehicle. In this case, the imaging unit 210 may include a charge-coupled device (CCD) camera.

The defog sensor 222 is provided in a defogging system 220, and performs a function of sensing the temperature of the windshield and external temperature. As described above, when the defog sensor 222 senses frost or demister of the windshield, the defogging system 220 operates an air-conditioning system inside the vehicle so as to remove the frost or demister.

The integrated control unit 230 analyzes a defog sensor signal received from the defog sensor 222, processes an image signal received from the imaging unit 210 based on the analyzed defog sensor signal, and acquires final lane information.

At this time, the integrated control unit 230 may analyze the defog sensor signal, and highlight the edges of the received image when a difference between the external temperature and the temperature of the windshield is less than a predetermined reference value.

Furthermore, as another method for acquiring accurate lane information, the integrated control unit 230 may analyze the defog sensor signal, and set a reference vanishing point region such that only an edge corresponding to a vanishing point in a predetermined region is recognized as a lane edge, when the difference between the external temperature and the temperature of the windshield is less than the predetermined reference value.

At this time, the predetermined reference value for the difference between the external temperature and the temperature of the windshield may be set to three degrees. The setting of the reference value reflects that frost or demister is formed on the windshield when the difference between the external temperature and the temperature of the windshield is less than three degrees, based on an experimental result.

Furthermore, the reference vanishing point region may be set in the range of above 20 pixels at the center point of the image to below 5 pixels at a point corresponding to 50 m to the front, in the case of a quarter video graphics array (QVGA). The reference vanishing point region reflects the region on which lane edges are likely to be concentrated when frost or demister is formed on the windshield.

In order to acquire more accurate lane information, the integrated control unit 30 may highlight the edges of the image, and simultaneously set the reference vanishing point region such that only an edge corresponding to a vanishing point in a predetermined region is recognized as a lane edge.

The integrated control unit 230 extracts the highlighted edges of the image or/and edges expected as lanes based on the reference vanishing point region, clusters the extracted edges through a predetermined algorithm, remove an unnecessary edge group, and then acquire final lane information. The predetermined algorithm may include a conventional algorithm. Thus, the detailed descriptions thereof are omitted herein, for convenience of description.

Then, the integrated control unit 330 transmits the final lane information to a lane recognition-based ADAS 340 of the vehicle through controller area network (CAN) communication.

Figure 3:
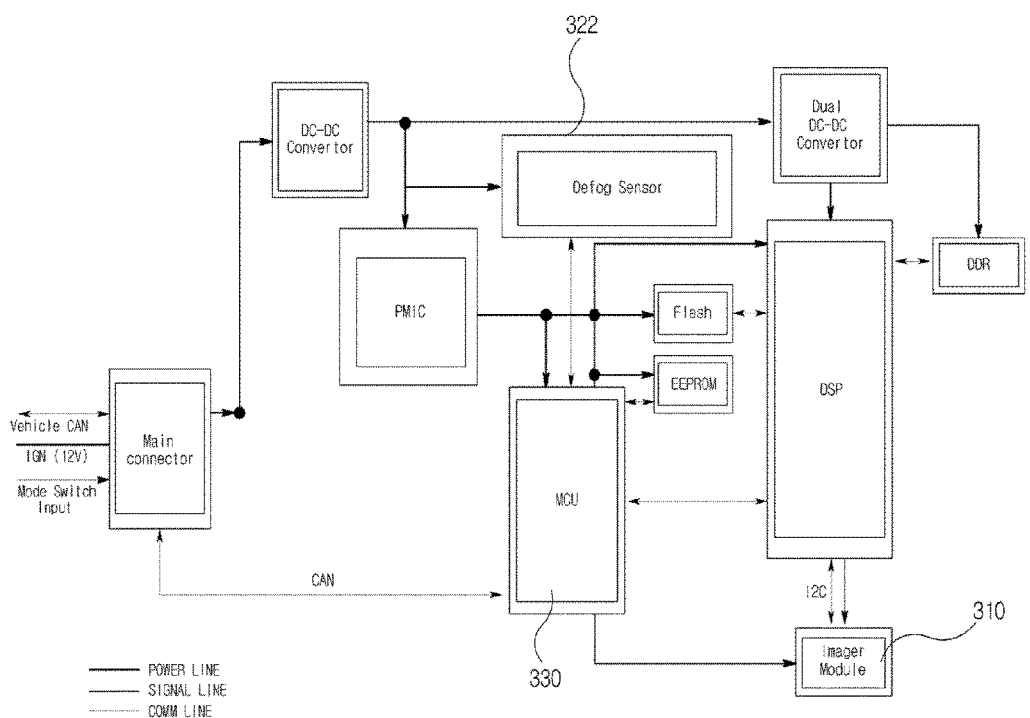
FIG. 3 is a diagram illustrating a system for implementing the lane recognition system using a defog sensor according to the embodiment of the present invention.

FIG. 3 is a diagram illustrating a system for implementing the lane recognition system using a defog sensor according to the embodiment of the present invention.

Referring to FIG. 3, the defog sensor 222, the imaging unit 210, and the integrated control unit 230 may be designed on the basis of a single electronic control unit (ECU). That is, a main connector, a DC-DC converter, a power management integrated circuit (PMIC), and a dual DC-DC converter, which are related to power supply of the system, an electrically erased programmable ROM (EEPROM), Flash, and a double data rate (DDR) RAM, which are related to a memory inside the system, and a digital signal processor (DSP), an imager module 310, a defog sensor 332, and a micro controller unit (MCU) 330, which are related to real-time digital processing, may be designed on the basis of one ECU. In this case, the imager module 310 corresponds to the imaging unit 210, and the MCU 330 corresponds to the integrated control unit 230.

Figure 4:
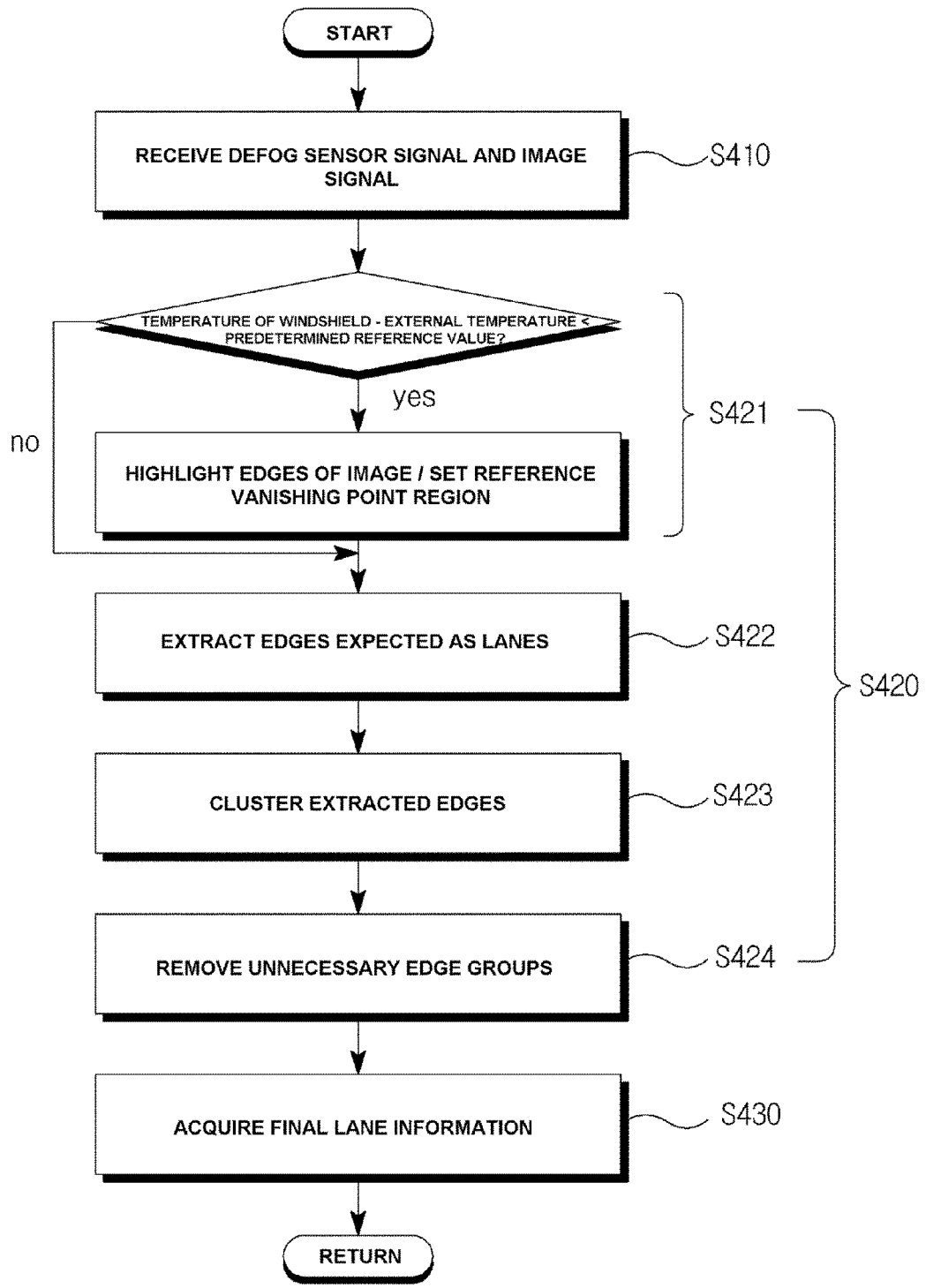
FIG. 4 is a flowchart of a lane recognition method using a defog sensor according to an embodiment of the present invention.
Figure 5:
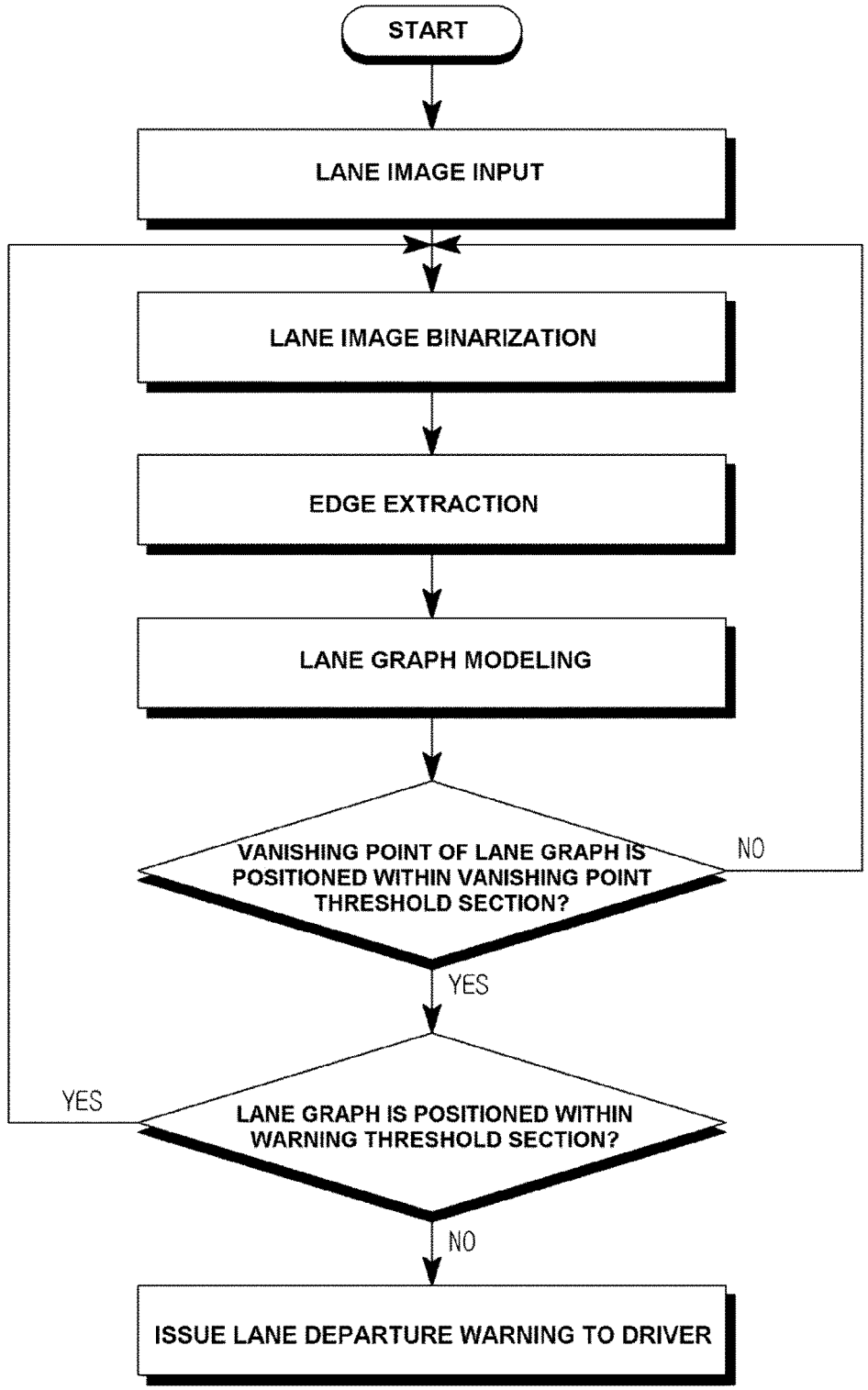
FIG. 5 is a flowchart illustrating a lane recognition technology according to the related art.

FIG. 4 is a flowchart of a lane recognition method using a defog sensor according to an embodiment of the present invention.

Referring to FIG. 4, the lane recognition method using a defog sensor according to the embodiment of the present invention includes a signal reception step S410, an imaging processing step S420, and a lane information acquisition step S430.

At the signal reception step S410, a defog sensor signal is received from the defog sensor 222 mounted in the defogging system 220, and an image signal is received from the imaging unit 210 which is mounted on the windshield of the vehicle so as to image the front of the vehicle.

In this case, the defog sensor 322 performs a function of sensing the temperature of the windshield and the external temperature, and the imaging unit 310 may include a CCD camera.

At the image processing step S420, the defog sensor signal received at the signal reception step S410 is analyzed, and the image signal is processed on the basis of the received defog sensor signal.

At this time, the image processing step S420 may include a processing reference setting step S421, an edge extraction step S422, a clustering step S423, and a filtering step S424, in order to process the image signal.

At the processing reference setting step S421, the defog sensor signal is analyzed, and the edges of the image are highlighted or/and a reference vanishing point region is set, when a difference between the temperature of the windshield and the external temperature is less than a predetermined reference value. At the following steps, the image is processed on the basis of the highlighted edges and/or the reference vanishing point region.

In this case, the predetermined reference value for the difference between the temperature of the windshield and the external temperature may be set to three degrees, and the reference vanishing point region may be set in the range of above 20 pixels at the center point of the image to below 5 pixels at a point corresponding to 50 m to the front, in the case of QVGA.

At the edge extraction step S422, edges expected as lanes are extracted. In this case, when the edges of the image are highlighted at the processing reference setting step S421, edges expected as lanes are extracted from the highlighted edges of the image. Furthermore, when the reference vanishing point region is set at the processing reference setting step S421, only an edge corresponding to a vanishing point in a predetermined region is extracted as an edge expected as a lane.

At the clustering step S423, the edges extracted at the edge extraction step S422 are clustered through a predetermined algorithm.

At the filtering step S424, unnecessary edge groups which do not correspond to the lane information are removed from the edge groups clustered at the clustering step S423.

At the clustering step S423 and the filtering step S424, the edges are may be clustered on the basis of the reference vanishing point region set at the processing reference setting step S421, and unnecessary edge groups which do not correspond to the lane information may be removed.

Since a number of techniques related to the clustering step S423 and the filtering step S424 are publicly known, the detailed descriptions thereof are omitted, for convenience of description.

At the lane information acquisition step S430, final lane information is acquired from the image processed at the image processing step S420. According to the embodiment of the present invention, even when frost or demister is formed on the windshield of the vehicle, accurate lane information may be acquired through the image processing step S420.

Then, the lane information acquired at the lane information acquisition step S430 is transmitted to the lane recognition-based ADAS 340 of the vehicle.

As described above, the signal reception step S410, the image processing step S420, and the lane information acquisition step S430 may be designed on the basis of a single ECU.

According to the embodiment of the present invention, the lane recognition system and method using a defog sensor according to the embodiments of the present invention may analyze the signal of the defog sensor, and acquire final lane information through image processing based on the analyzed defog sensor signal. Thus, the lane recognition system and method may accurately recognize the lane even in a special environment in which frost or demister is formed on the windshield, and minimize a malfunction of a lane departure warning device or the like, thereby reducing the risk of an accident during operation.

While the present invention has been described with respect to the specific embodiments, it will be apparent to those skilled in the art that various changes and modifications may be made without departing from the spirit and scope of the invention as defined in the following claims.

What is claimed is:

1. A lane recognition system using a defog sensor, comprising:

a defog sensor mounted in a defogging system of a vehicle;

an imaging unit mounted on a windshield of the vehicle so as to image the front of the vehicle; and an integrated control unit configured to analyze a defog sensor signal received from the defog sensor, process an image signal received from the imaging unit based on the analyzed defog sensor signal, and acquire lane information, wherein the defog sensor senses the temperature of the windshield and the external temperature, and wherein when processing the image signal, the integrated control unit analyzes the defog sensor signal, and highlights edges of the image in case where a difference between the temperature of the windshield and the external temperature is less than a predetermined value.

2. A lane recognition system using a defog sensor, comprising:

a defog sensor mounted in a defogging system of a vehicle;

an imaging unit mounted on a windshield of the vehicle so as to image the front of the vehicle; and an integrated control unit configured to analyze a defog sensor signal received from the defog sensor, process an image signal received from the imaging unit based on the analyzed defog sensor signal, and acquire lane information, wherein when processing the image signal, the integrated control unit analyzes the defog sensor signal, and sets a reference vanishing point region such that only an edge corresponding to a vanishing point in a predetermined region is recognized as a lane edge, in case where a difference between the temperature of the windshield and the external temperature is less than a predetermined value.

3. A lane recognition system using a defog sensor, comprising:

a defog sensor mounted in a defogging system of a vehicle;

an imaging unit mounted on a windshield of the vehicle so as to image the front of the vehicle; and an integrated control unit configured to analyze a defog sensor signal received from the defog sensor, process an image signal received from the imaging unit based on the analyzed defog sensor signal, and acquire lane information, wherein when processing the image signal, the integrated control unit analyzes the defog sensor signal, and highlights edges of the image or sets a reference vanishing point region such that only an edge corresponding to a vanishing point in a predetermined region is recognized as a lane edge, in case where a difference between the temperature of the windshield and the external temperature is less than a predetermined value.

4. The lane recognition system according to claim 2, wherein the integrated control unit extracts edges expected as lines on the basis of one or more of the highlighted edges of the image and the reference vanishing point region, clusters the extracted edges through a predetermined algorithm, and removes unnecessary edge groups which do not correspond to the lane information, thereby acquiring lane information.

5. The lane recognition system according to claim 2, wherein the predetermined reference value is set to three degrees.

6. The lane recognition system according to claim 2, wherein the reference vanishing point region is set in the range of above 20 pixels at the center point of the image to below 5 pixels at a point corresponding to 50 m to the front, in the case of a quarter video graphics array (QVGA).

7. The lane recognition system according to claim 2, wherein the integrated control unit transmits the acquired lane information to a lane recognition-based advanced driver assistance system (ADAS) of the vehicle.

8. The lane recognition system according to claim 1, wherein the imaging unit comprises a charge-coupled device (CCD) camera.

9. The lane recognition system according to claim 1, wherein the defog sensor, the imaging unit, and the integrated control unit are implemented on the basis of a single ECU.

10. A lane recognition method using a defog sensor, comprising:

a signal reception step of receiving a defog sensor signal from a defog sensor provided in a defogging system of a vehicle, and receiving an image signal from an imaging unit which is mounted on a windshield of the vehicle so as to image the front of the vehicle;

an image processing step of analyzing the defog sensor signal received at the signal reception step and processing the image signal based on the analyzed defog sensor signal; and acquiring lane information from the image processed at the image processing step, wherein the image processing step comprises:

a processing reference setting step of analyzing the defog sensor signal and highlighting edges of the image or setting a reference vanishing point region when a difference between the temperature of the windshield and the external temperature is less than a predetermined reference value;

an edge extraction step of extracting edges expected as lanes on the basis of the reference set at the processing reference setting step;

a clustering step of clustering the edges extracted at the edge extraction step through a predetermined algorithm; and a filtering step of removing unnecessary edge groups which do not correspond to the lane information among the edge groups formed at the clustering step.

11. The lane recognition method according to claim 10, wherein the predetermined reference value is set to three degrees.

12. The lane recognition method according to claim 10, wherein the reference vanishing point region is set in the range of above 20 pixels at the center point of the image to below 5 pixels at a point corresponding to 50 m to the front, in the case of a QVGA.

13. The lane recognition method according to claim 10, further comprising transmitting the acquired lane information to a lane recognition-based ADAS of the vehicle, after the lane information acquisition step.

14. The lane recognition method according to claim 10, wherein the signal reception step, the image processing step, and the lane information acquisition step are implemented on the basis of a single ECU.

* * * * *